United States Patent
Komini Babu et al.

(10) Patent No.: US 12,009,525 B2
(45) Date of Patent: Jun. 11, 2024

(54) COAXIAL NANOWIRE ELECTRODE

(71) Applicant: Triad National Security, LLC, Los Alamos, NM (US)

(72) Inventors: Siddharth Komini Babu, Los Alamos, NM (US); Jacob Schatz Spendelow, Los Alamos, NM (US); Rangachary Mukundan, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 17 days.

(21) Appl. No.: 16/839,685

(22) Filed: Apr. 3, 2020

(65) Prior Publication Data
US 2020/0321626 A1    Oct. 8, 2020

Related U.S. Application Data

(60) Provisional application No. 62/829,341, filed on Apr. 4, 2019.

(51) Int. Cl.
| | |
|---|---|
| *H01M 8/10* | (2016.01) |
| *H01M 4/86* | (2006.01) |
| *H01M 4/88* | (2006.01) |
| *H01M 8/1004* | (2016.01) |

(52) U.S. Cl.
CPC ....... *H01M 4/8892* (2013.01); *H01M 4/8673* (2013.01); *H01M 8/1004* (2013.01); *H01M 2008/1095* (2013.01)

(58) Field of Classification Search
CPC ............. H01M 4/8892; H01M 4/8878; H01M 4/8875; H01M 4/8663; H01M 4/8673; H01M 8/1004; H01M 2008/1095
See application file for complete search history.

(56) References Cited

U.S. PATENT DOCUMENTS

| | | | |
|---|---|---|---|
| 2006/0040168 A1* | 2/2006 | Sridhar | C30B 29/62 |
| | | | 429/482 |
| 2006/0188774 A1* | 8/2006 | Niu | H01M 4/8853 |
| | | | 429/409 |
| 2018/0294500 A1* | 10/2018 | Yang | H01M 8/1086 |

FOREIGN PATENT DOCUMENTS

JP    2017-212177    * 11/2017    ............ H01M 8/02

OTHER PUBLICATIONS

Translation (machined-generated) of JP 2017-212177, Kinoshita Shinji, published Nov. 30, 2017.*
Gottesfeld "The Polymer Electrolyte Fuel Cell: Materials Issues in a Hydrogen Fueled Power Source" LANL Hydrogen Education Site; http://sites.science.oregonstate.edu/~hetheriw/energy/topics/doc/electrochemistry/fc/basic/The_Polymer_Electrolyte_Fuel_Cell.htm; accessed Oct. 15, 2020; pp. 1-5.

* cited by examiner

*Primary Examiner* — Raymond Alejandro

(57) ABSTRACT

A polymer electrolyte fuel cell (PEFC), comprises a first electrode and a second electrode, wherein the first electrode includes a coaxial nanowire electrode. In some embodiments, the coaxial nanowire electrode comprises a plurality of ionomer nanowires, and a catalyst coating that coats at least part of the ionomer nanowires. Moreover, in some embodiments, a nanowire of the plurality of ionomer nanowires and a section of the catalyst coating that coats the nanowire form two coaxial cylinders.

7 Claims, 15 Drawing Sheets

210

220

370A

370B

370C

370D

630

640

COAXIAL NANOWIRE ELECTRODE

RELATED APPLICATIONS

This non-provisional application claims the benefit of priority in U.S. provisional application No. 62/829,341, filed Apr. 4, 2019, and entitled "COAXIAL NANOWIRE ELECTRODE," the entire content of which is incorporated herein by reference.

FEDERALLY SPONSORED RESEARCH OR DEVELOPMENT

The United States government has rights in this invention pursuant to Contract No. 89233218CNA000001 between the United States Department of Energy (DOE), the National Nuclear Security Administration (NNSA), and Triad National Security, LLC for the operation of Los Alamos National Laboratory.

TECHNICAL FIELD

The present disclosure relates generally to electrochemical cells and in particular to fuel cells.

BACKGROUND

A fuel cell is an electrochemical cell that converts potential energy from a fuel into electrical energy through an electrochemical reaction. A specific type of fuel cell is a polymer electrolyte fuel cell (PEFC), which may be used by electric vehicles, for residential uses, or for other uses.

PEFCs may use the oxidation of hydrogen, methanol, or other fuels to release protons. The protons ($H^+$) move across an electrolyte to a cathode where the protons react with oxygen to produce water. Electrons move via an external circuit from the anode toward the cathode side of the PEFC, providing power to external devices.

In conventional PEFCs, a membrane is positioned between the anode and the cathode to form a membrane-electrode assembly. The membrane-electrode assembly may include a proton-conducting membrane electrolyte with a composite catalyst layer adjacent to each of its surfaces.

Specifically, the catalyst layer may include a relatively low to high loading of platinum (Pt) or Pt-alloy on carbon supports. Pt/C powder may be prepared using colloid chemistry, which refers to the suspension of one substance of microscopically dispersed insoluble particles throughout another substance. The Pt permits the electrochemical conversion of hydrogen and oxygen at the anode and cathode, respectively, into electric current (e.g., electric power).

Moreover, in the conventional PEFCs, the Pt/C powder may be intermixed with an ionomer to provide ionic conductivity within the catalyst layer. In other words, the catalyst layer may be referred to as a Pt/C/ionomer composite, where each of the three components are uniformly distributed within the catalyst layer.

The membrane-electrode assembly may be formed in an uncontrolled ink deposition process that produces random aggregates of catalyst, ionomer, and pore volume. The high tortuosity and poor percolation of ionomer in these random aggregates may cause low effective conductivity, requiring the use of high ionomer content to minimize ohmic losses due to proton conduction. This may result in significant mass transport limitations during high-power operation, in turn resulting in a loss in performance, and requiring a high loading and active area of Pt to maintain an acceptable level of performance.

Moreover, the ionomer may add an additional transport resistance because reactants must diffuse through a thicker ionomer film. This may become a significant cause of poor performance at lower Pt loadings. The ionomer may also poison the surface of the catalyst, reducing activity of the catalyst.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings.

DETAILED DESCRIPTION

Figure 1A:
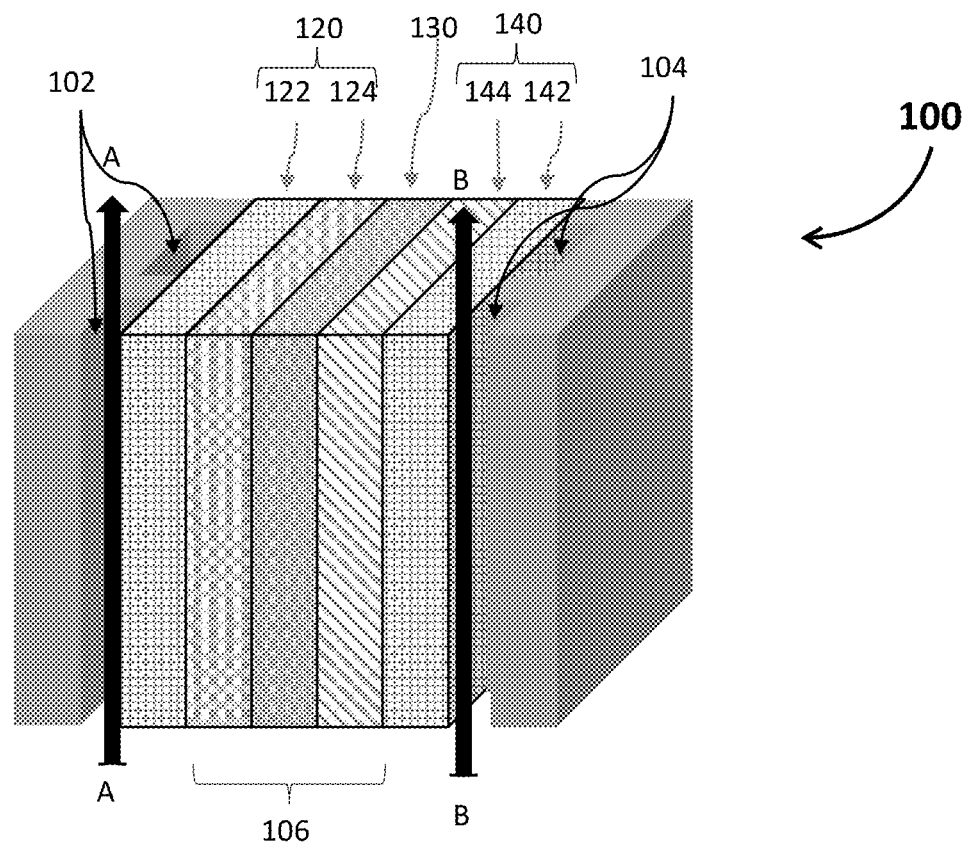
FIGS. 1A-1C are views of PEFCs according to some embodiments.

As detailed above, there are several drawbacks to the conventional Pt/C/ionomer composite, including low effective conductivity, resulting in significant mass transport limitations during high-power operation. Some embodiments overcome the above and other related drawbacks in the conventional PEFCs by using coaxial nanowire electrodes, as detailed below. The following characteristics will be listed and then explained in the ensuing detailed descriptions of the drawings.

Some embodiments provide PEFCs that include ionomer nanowires coated with catalyst nano-films in place of one or more of the Pt/C or Pt/C/ionomer catalyst layers. The nanowires may protrude perpendicularly from an electrolyte membrane.

In various embodiments, the PEFCs may exhibit increased performance (e.g., decreased transport resistance) and durability over conventional PEFCs. This may be due, at least in part, to the PEFCs of the present disclosure having reduced ionomer content as compared to conventional PEFCs. Due at least in part to having decreased ionomer content, PEFCs of the present disclosure may be lower-cost and high-power density alternatives to conventional PEFCs.

Further, in some embodiments, the PEFC may eliminate the carbon support needed in conventional PEFCs. Since carbon supports are vulnerable to corrosion, PEFCs of the present disclosure may exhibit increased durability and lifetime as compared to conventional PEFCs.

Some embodiments provide ionomer nanowires that support catalyst nano-films in a coaxial configuration. The ionomer nanowires may provide enhanced protonic conductivity through the electrode while also having reduced ionomer content in catalyst portions of the electrode. The reduction in ionomer content in the catalyzed portions may reduce $O_2$ transport resistance and improve activity of the catalyst by preventing the poisoning of its surface with ionomer.

Moreover, various embodiments increase the durability of the PEFC compared to the conventional PFFCs. In a conventional PEFC, the carbon support for the catalyst in the electrodes undergoes carbon oxidation during operation. The oxidation may lead to detachment of the catalyst nanoparticles from the carbon, rendering the detached particles inactive. Hence the surface area available for electrochemical reaction may be reduced due to presence of the inactive particles. Carbon oxidation may also cause loss in carbon volume, leading to compaction of the catalyst layer and reduction of the pore volume for gaseous transport. Various embodiments replace the conventional carbon support for the catalyst with the ionomer nanowires, removing the need for carbon in the electrodes. In some embodiments, the electronic conductivity that in a conventional PEFC may be a function of the carbon support may be instead provided by coaxial nanowires with a percolating catalyst film on top of the ionomer. Because the ionomer may not undergo an oxidation in the manner experienced by carbon, the catalyst film on the ionomer may remain active for a longer duration.

The catalyst may be deposited on the ionomer nanowires or transferred to the ionomer nanowires to synthesize a catalyst section for the PEFC without the use of traditional carbon support. This may increase the performance and durability of the electrode. The nanowires may also enhance ionic conductivity in low relative humidity conditions, thereby improving performance compared to a baseline electrode.

The teachings of the present disclosure may be extended to various thermoplastic polymer membrane. The teachings of the present disclosure may also be implemented with several catalysts, such as, platinum (Pt), palladium (Pd), cobalt (Co), nickel (Ni), gold (Au), silver (Ag), iridium (Ir), etc., and their alloys.

In some embodiments, the PEFC may have the structure of an electrochemical cell. That is, the PEFC may have an electrode/electrolyte/electrode architecture, as illustrated in FIGS. 1A-1C.

Figure 1B:
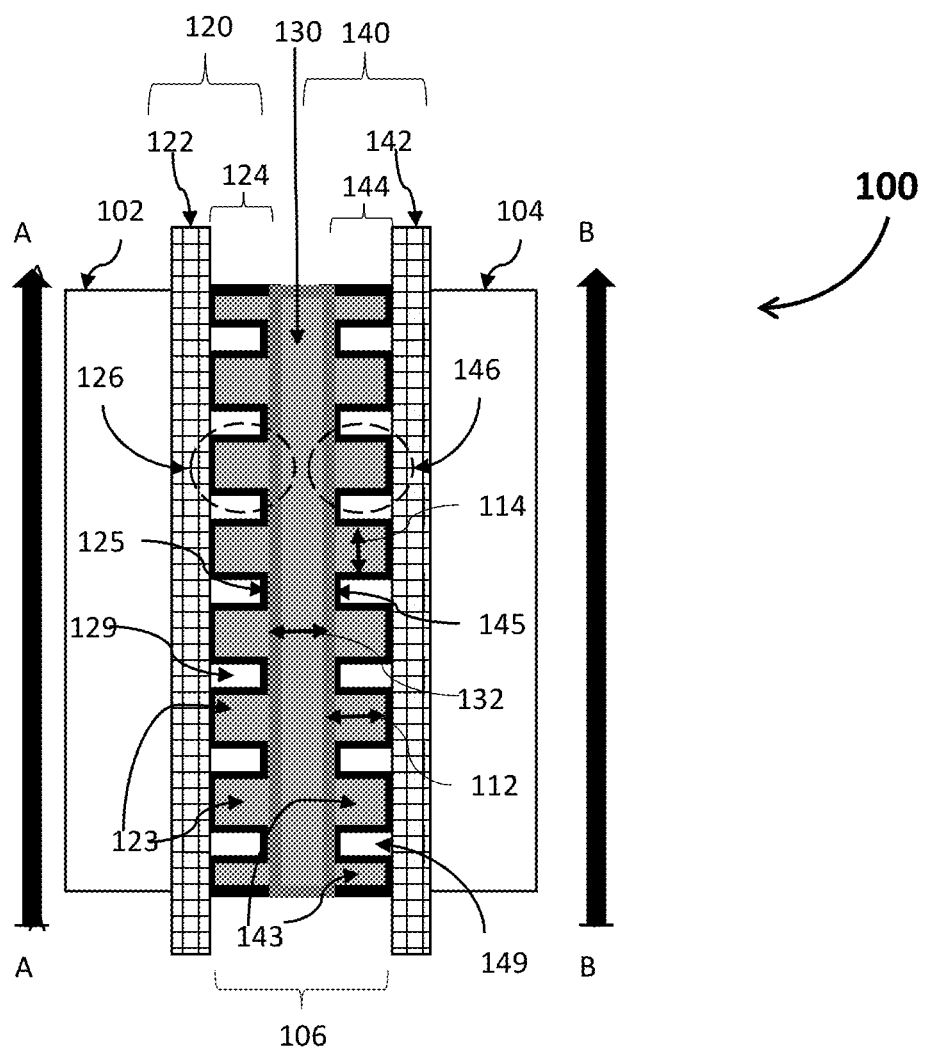
Figure 1C:
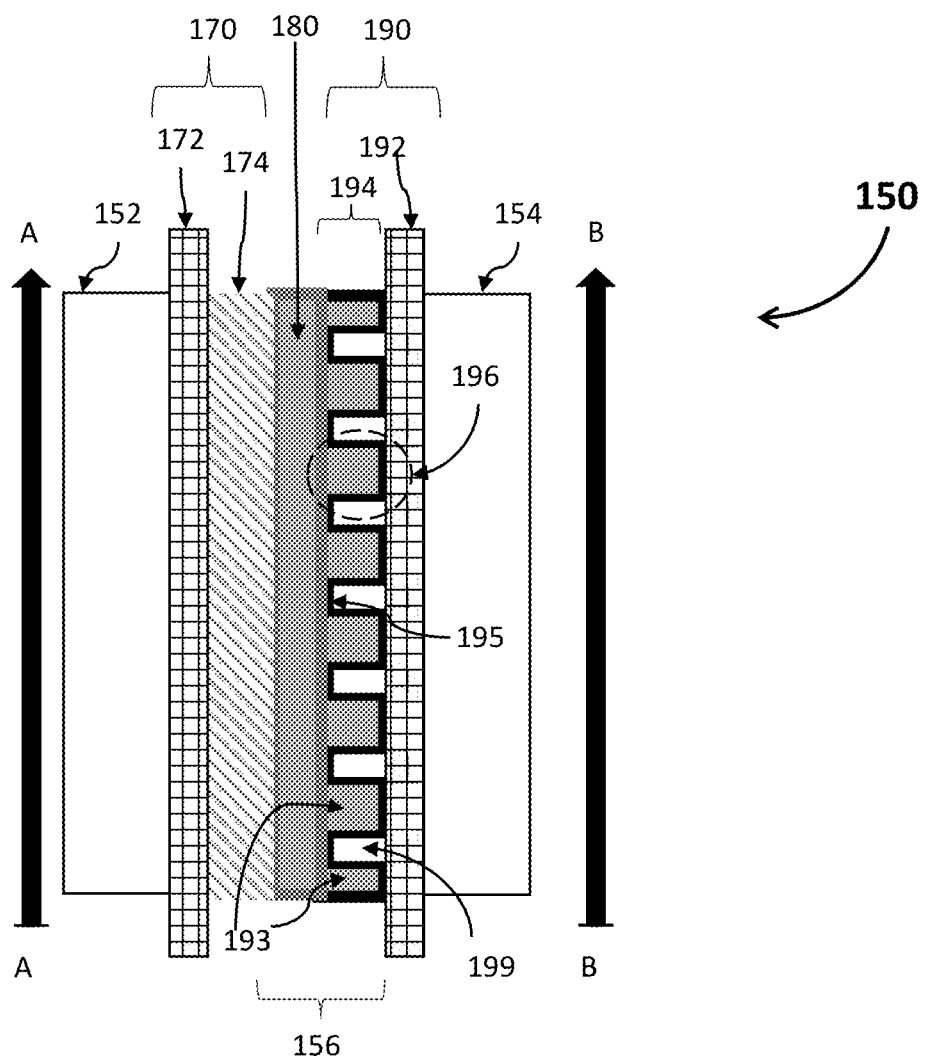

FIGS. 1A and 1B are two views of a PEFC 100 according to some embodiments. In particular, FIG. 1A is a three dimensional sketch view of PEFC 100 and FIG. 1B is a two dimensional cross sectional view of PEFC 100. As illustrated in FIGS. 1A and 1B, PEFC 100 includes an anode-side flow-channel 102, an anode 120, a membrane electrolyte 130 (grey rectangle in the middle in FIG. 1B), a cathode 140, and a cathode-side flow-channel 104. Anode 120 and cathode 140 may be collectively called electrodes.

Anode 120, in turn, includes an anode gas-diffusion medium (or "backing") 122 and an anode-side coaxial nanowire electrode 124, which itself includes a plurality of protrusions 126, each called a coaxial nano-channel 126 (aka nano-channel for brevity). Each nano-channel 126 includes an ionomer nanowire 123 (light grey part, aka a nanowire for brevity) and a catalyst coating 125 (black coatings over each nanowires 123). The spaces between nan-channels 126 form voids 129.

Similarly, cathode 140 includes a cathode gas-diffusion medium 142 and a cathode-side coaxial nanowire electrode 144, which itself includes a plurality of nano-channels 146, each including an ionomer nanowire 143 and a catalyst coating 145, and forming voids 149.

As generally noted before, the parts in FIGS. 1A and 1B are not necessarily to scale. In particular, height and width of the nano-channels (respectively marked by a double arrow 112 and a double arrow 114 for two of the nano-channels) may not be of the same scale as the width of the membrane (marked by a double arrow 132) as they appear in FIG. 1A. Instead, in some embodiments, width 132 of the membrane may be in the range 5-100 μm (micrometers), while height 112 of a coaxial nano-channel may be in the range 0.5-10 μm, and its width may be in the range 75-750 nm (nanometers). Moreover, while nano-channels 126 are shown to protrude perpendicularly from membrane 130, in various embodiments, each nano-channel may be approximately perpendicular to the membrane, by making an angle near 90 degrees. In some embodiments the angle is between 45 to 135 degrees. In some embodiments, the nano-channels are vertically aligned.

Anode-side flow-channel 102 and cathode-side flow-channel 104 provide channels for the flow of the corresponding reactant gas (e.g., in a hydrogen/air fuel cell, respectively Hydrogen gas $H_2$ and Oxygen gas $O_2$ respectively) in the directions A-A and B-B adjacent to the corresponding electrode. These flow channels may each include a current collector plate. The current collector plates may be made of, for example, graphite, stainless steel, aluminum, titanium, or composite materials.

Anode 110 is a negative electrode at which oxidation occurs. At anode 110, a catalyst causes the anode side reactant gas (e.g. Hydrogen gas $H_2$) to undergo oxidation reactions that generate protons and electrons. In a hydrogen/air fuel cell, $H_2$ may be fed through Anode-side flow-channel 102 along the anode 110 in the direction of arrow A-A, resulting in oxidation reactions represented by Eq. (1).

$$H_2 = 2H^+ + 2e^- \qquad \text{Eq. (1)}$$

Anode 110 may be comprised of one or more materials capable of causing a fuel to undergo oxidation reactions to generate protons and electrons. Non-limiting examples of types and compositions of anode 110 that may be implemented as part of a PEFC may include Pt and Pt-alloy nanoparticles supported on carbons (high surface area carbon, Vulcan, etc.) bound by ionomer like PFSA; Pt black bound by ionomer or other polymer; mixture of the Pt supported carbon and Ir, $IrO_2$, or other catalysts.

Cathode 120 is a positive electrode at which reduction occurs. In a hydrogen/air fuel cell, $O_2$ may be fed through cathode-side flow-channel 104 as the cathode side reactant gas along cathode 120 in the direction of arrow B-B. At the cathode, a catalyst causes hydrogen ions, electrons, and oxygen to react to form water, which may be represented by Eq. (2).

$$O_2 + 4e^- + 4H^+ = 2H_2O \qquad \text{Eq. (2)}$$

Cathode 120 may be comprised of one or more materials capable of causing such reduction reactions. Non-limiting examples of types and compositions of a cathode that may be implemented as part of a PEFC may include Pt and Pt-alloy nanoparticles supported on carbons (high surface area carbon, Vulcan, etc.) bound by ionomer like PFSA; Pt black bound by ionomer or other polymer; and ionomer free Pt deposited via physical vapor or chemical vapor deposition or atomic layer deposition methods.

Segregating the electrodes into proton-conducting ionomer nanowires may reduce an amount of $O_2$-blocking ionomer in the catalyzed elements of coaxial nanowire electrodes 124 and 144. Moreover, using the ionomer nanowires instead of the conventional carbon support may achieve higher performance and durability.

Also, the ionomer nanowires may have low tortuosity. In other words, the ionomer nanowires may be nearly impervious to being twisted.

In some embodiments, the ionomer is a polymer composed of repeating units of both electrically neutral units and ionized units covalently bonded to the polymer backbone. Various types of ionomer may be used to fabricate the ionomer nanowires. Example ionomers that may be used include, but are not limited to, perfluorosulfonic acid (PFSA) ionomer, perfluoroimide acid (PFIA), sulfonated hydrocarbon ionomers, high temperature ionomers such as phosphoric acid doped polybenzimidazole, or other ionomers.

Catalyst coatings 125 and 145 include a catalyst material and cover all or part of the surfaces of ionomer nanowires 123 and 143.

Gas-diffusion layers 122 and 142 enable access of reactant gases (e.g., hydrogen and oxygen) to catalyst coatings 125 and 145, respectively. This enablement may avoid diffusing through films of liquid water. Gas-diffusion layers 122 and 142 may be made of hydrophobized porous carbon paper, carbon cloth, or some other material. These layers may be wet-proofed by treatment with poly-tetrafluoroethylene (PTFE).

In various embodiments, membrane 130 may include different types of thermoplastic polymers. The thermoplastic polymer membrane may include, for example, Nafion, Aquivion, and Flemion.

In some embodiments, the membrane is made of the same material as the nanowires. In some embodiments, the nanowires are protrusions extending out of the membrane.

In some embodiments the combination of membrane 130 with the two coaxial nanowire electrodes 124 and 144 on its two sides is called a two-sided membrane-nanowire electrode assembly, marked by label 106 in FIGS. 1A and 1B. Moreover, the combination of membrane 130 and the plurality of ionomer nanowires 123 and 143 protruding from its two sides is called a two-sided membrane-nanowire assembly.

In some embodiments, the ionomer is perfluorosulfonic acid (PFSA).

Some embodiments utilize a coaxial nanowire electrode for one of the two electrodes. FIG. 1C is a two dimensional cross sectional view of a PEFC 150, according to one such embodiment. PEFC 150 includes an anode-side flow-channel 152, an anode 170, a membrane electrolyte 180, a cathode 190, and a cathode-side flow-channel 154.

Anode 170, in turn, includes an anode gas-diffusion medium 172 and an anode-side catalyst layer 174.

Cathode 190, on the other hand, includes a cathode gas-diffusion medium 192 and a cathode-side coaxial nanowire electrode 194, which itself includes a plurality of nano-channels 196, each including an ionomer nanowire 193 and a catalyst coating 195, forming voids 199. These parts of cathode 190 are similar to their counterparts in cathode 140 of PEFC 100 in FIG. 1B.

Anode-side catalyst layer 174 may be similar to the catalyst layers used in conventional PEFCs, e.g., the Pt/C/ionomer composite Therefore, PEFC 150 utilizes the advantages of the coaxial nanowire electrode only in its cathode.

Some other embodiments may switch the types of electrodes compared to PEFC 150; that is, utilize an anode-side coaxial nanowire electrode for the anode and a conventional catalyst layer for the cathode.

In embodiments that only include one coaxial nanowire electrode (i.e., either only the anode-side type or only the cathode-side type) the combination of membrane 180 with that coaxial nanowire electrode on one side is called a one-sided membrane-nanowire electrode assembly, marked by label 156 in FIG. 1C. Moreover, the combination of membrane 180 and the plurality of ionomer nanowires (such as nanowires 193) protruding from one side is called a one-sided membrane-nanowire assembly.

Figure 2A:
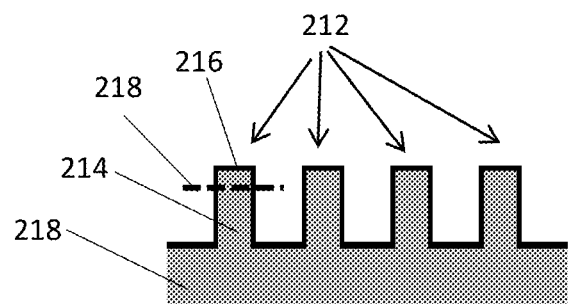
FIGS. 2A and 2B illustrate the structure and designs of coaxial nanowire electrodes according to some embodiments
Figure 2A:
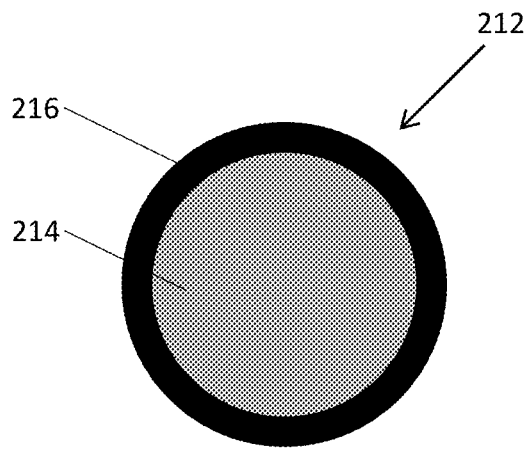
Figure 2B:
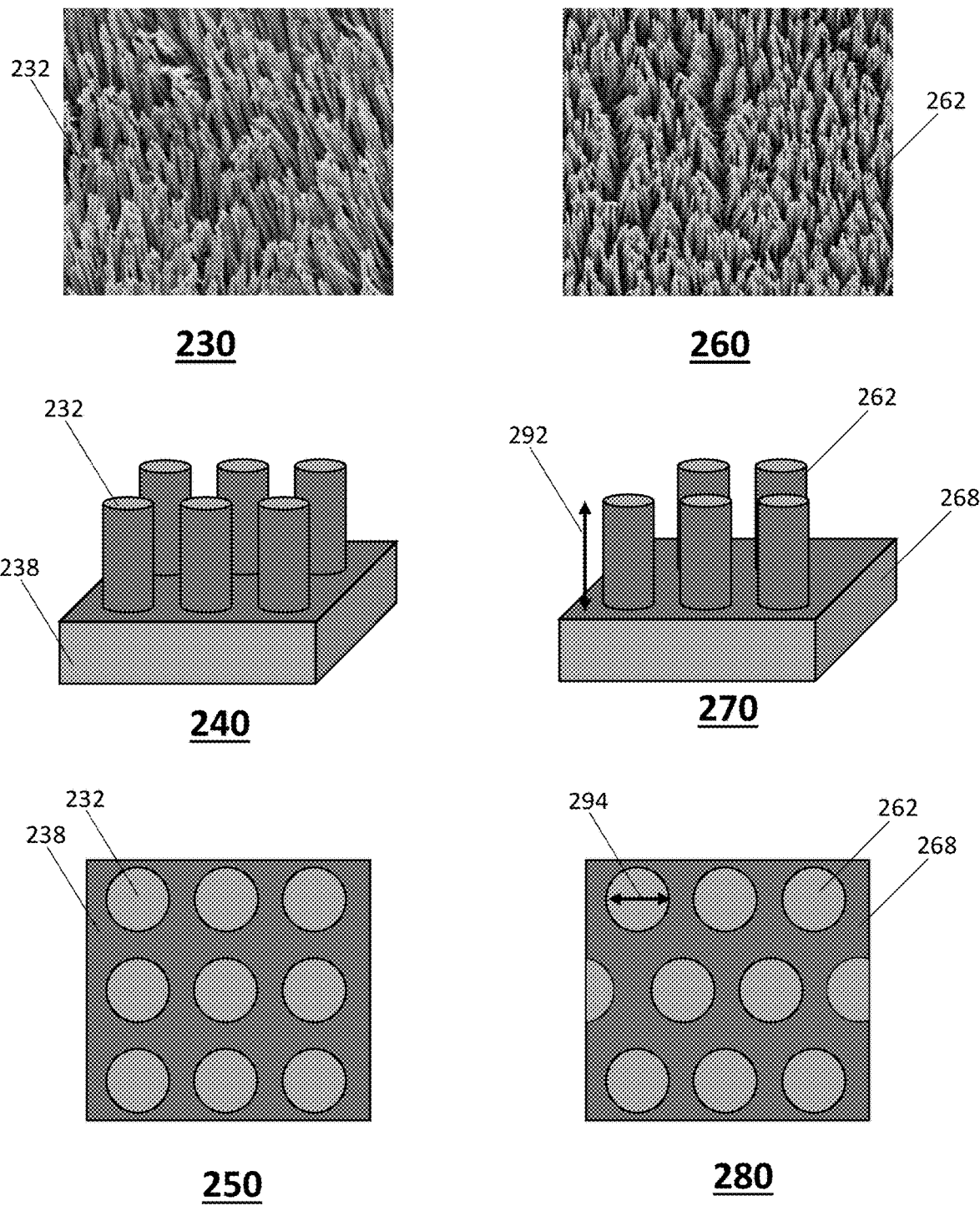

FIGS. 2A and 2B illustrate the structure and designs of coaxial nanowire electrodes in more detail and according to some embodiments. In particular, FIG. 2A illustrates the structure of coaxial nano-channel and FIG. 2B shows two different configurations of nano-channels according to some embodiments.

FIG. 2A shows a cross section of a section 210 of a coaxial nanowire electrode and a cross section 220 of a nano-channel according to an embodiment. In particular, section 210 includes a membrane 218 (part of which is shown in section 210) and four coaxial nano-channels 212 protruding vertically from the membrane. Each nano-channel includes an ionomer nanowire 214 and a catalyst coating 216.

Cross section 220 shows a top view of a cross section along a plane 218 of one of nano-channels 212. Cross section 220 illustrates that in each nano-channel, the corresponding nanowire 214 and the lateral surface of the catalyst coating 216 that surrounds that nanowire form two coaxial cylinders, the nanowire being similar to a solid cylinder and the catalyst coating being similar to a hollow cylinder.

FIG. 2B includes six views of two different configurations of the nano-channels according to various embodiments. In particular, views 230, 240, and 250 are respectively a Scanning Electron Microscopic (SEM) image, a 3D schematic view, and a top view of a square configuration of nano-channels 232 on a membrane 238. On the other hand, views 260, 270, and 258 are respectively an SEM image, a 3D schematic view, and a top view of a hexagonal configuration of nano-channels 262 on a membrane 268.

In different embodiments, the nano-channels may also have different aspect ratios. The aspect ratio is the ratio of the height 292 to the width 294 of a nano-channel. In various embodiments, the aspect may range from about 1 to about 60. A higher aspect ratios may lead to a higher surface area or surface roughness, which may in turn be beneficial due to increased interface between the ionomer and the catalyst.

In various embodiments, the coaxial nanowire electrode may be fabricated in various manners. In some embodiments, the nanowire electrode may be generated from solid-phase ionomer. In some other embodiments, the nanowire electrode may be generated from liquid-phase ionomer. Some methods of fabrication are described in more details below.

Figure 3A:
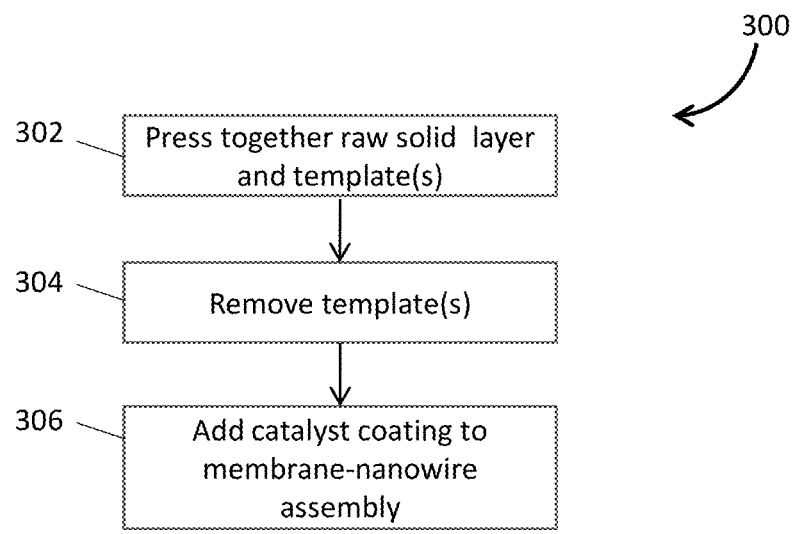
FIGS. 3A-3D illustrate a method of fabricating the nanowire electrodes according to some embodiments.
Figure 3B:
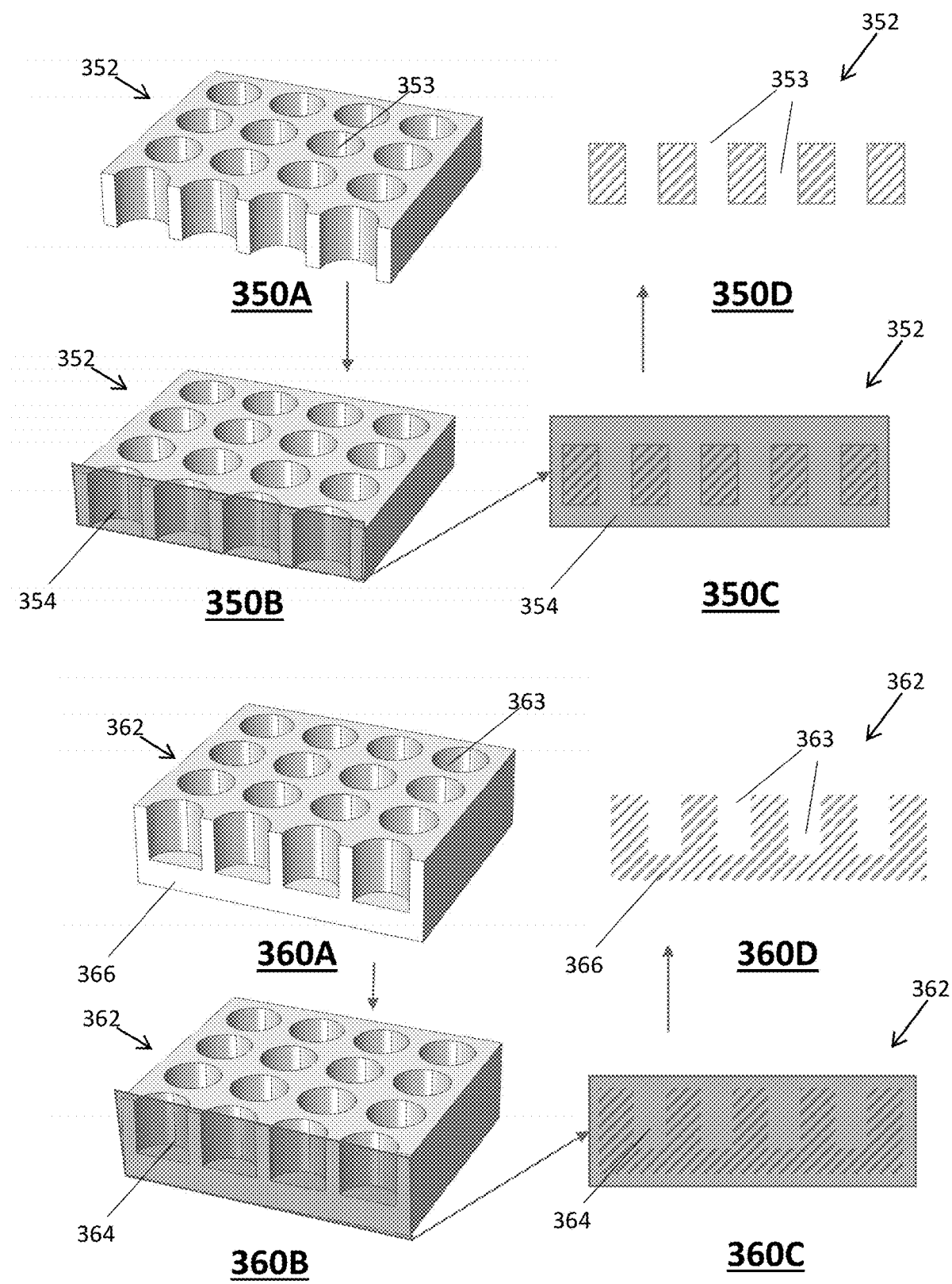

FIGS. 3A-3D illustrate a method of fabricating the nanowire electrodes according to some embodiments. In particular, FIG. 3A is a flow chart 300 for the fabrication. FIG. 3B, on the other hand, illustrates details of some porous templates as used in the fabrication. And FIGS. 3C and 3D each show four views corresponding to the three steps of flowchart 300 according to two different embodiments, as detailed below.

Referring to flowchart 300 of FIG. 3A, in step 302, a raw solid ionomer layer is pressed against one or two porous templates to generate a patterned ionomer layer. A patterned ionomer layer is a layer of the solid ionomer, which has the pattern of the desired ionomer nanowires, e.g., includes the desired membrane and ionomer nanowires on both sides (as in PEFC 100 of FIG. 1B) or on one side (as in PEFC 150 of FIG. 1C). In some embodiments, a patterned ionomer assembly provides a membrane-nanowire assembly for a PEFC. A raw solid ionomer layer, on the other hand, is a solid ionomer layer before it is thus patterned.

The porous template may be a commercially available porous template with pores of controlled diameter. FIG. 3B includes different views of two different porous templates. In particular views 350A and 350B are 3D views of a two-sided template 352, for which the view is concatenated by an imaginary plane 354. Template 352 defines two-sided pores 353, in the shape of holes that span the full thickness of template 352. Views 350C and 350D, on the other hand are cross sectional front views of template 352, as viewed perpendicular to imaginary plane 354. View 350C also shows imaginary plane 354 for reference.

Views 360A and 360B, on the other hand, are 3D views of a one-sided template 362, for which the view is concatenated by an imaginary plane 364. Template 362 defines one-sided pores 363, in the shape of one-sided holes that span part of, and not all of, the thickness of template 362. One sided template 362, therefore, has a porous face (the top face in views 360A and 360B) and a non-porous face (the bottom face 366 in views 360A and 360B). The non-porous face blocks the holes on one end, e.g., at the bottom in views 360A-D. Views 360C and 360D are cross sectional front views of template 362, as viewed perpendicular to imaginary plane 364. View 360C also shows imaginary plane 364 for reference.

The porous template may be an anodized aluminum oxide (AAO) template, an anodized titanium oxide template, a porous silicon template, or a track-etched polycarbonate (TEP) template. In one example, the template may be an AAO template with about 300 nm pore diameter and about 5 μm pore length.

Figure 3C:
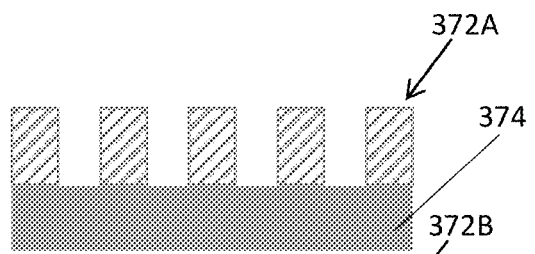
Figure 3C:
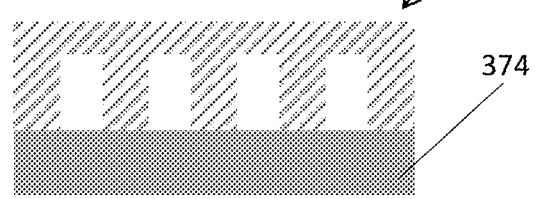
Figure 3C:
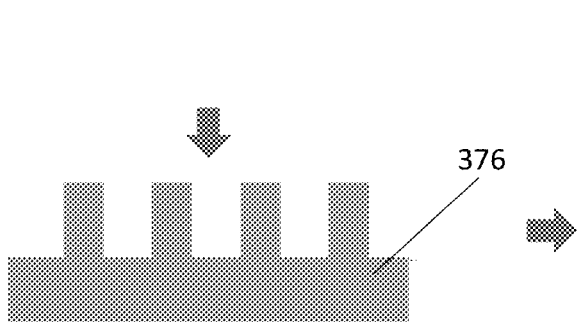
Figure 3C:
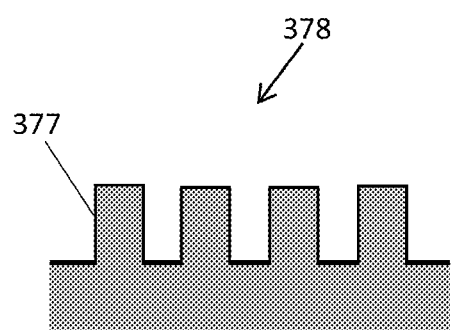

Referring to FIG. 3C, view 370A shows two alternative ways to initiate step 202 of flowchart 300. The upper part shows a two-sided template 372A placed in contact with a raw solid ionomer layer 374, while the lower part shows a one-sided template 372B placed in contact with raw solid ionomer layer 374. The two methods will proceed similarly. Therefore, going forward, the stages are only illustrated for two-sided template 372A, with the understanding that a similar stage is possible with one-sided template 372B.

View 370B shows template 372A after it has been pressed against raw solid ionomer layer 374 to generate patterned ionomer layer 376.

Figure 3D:
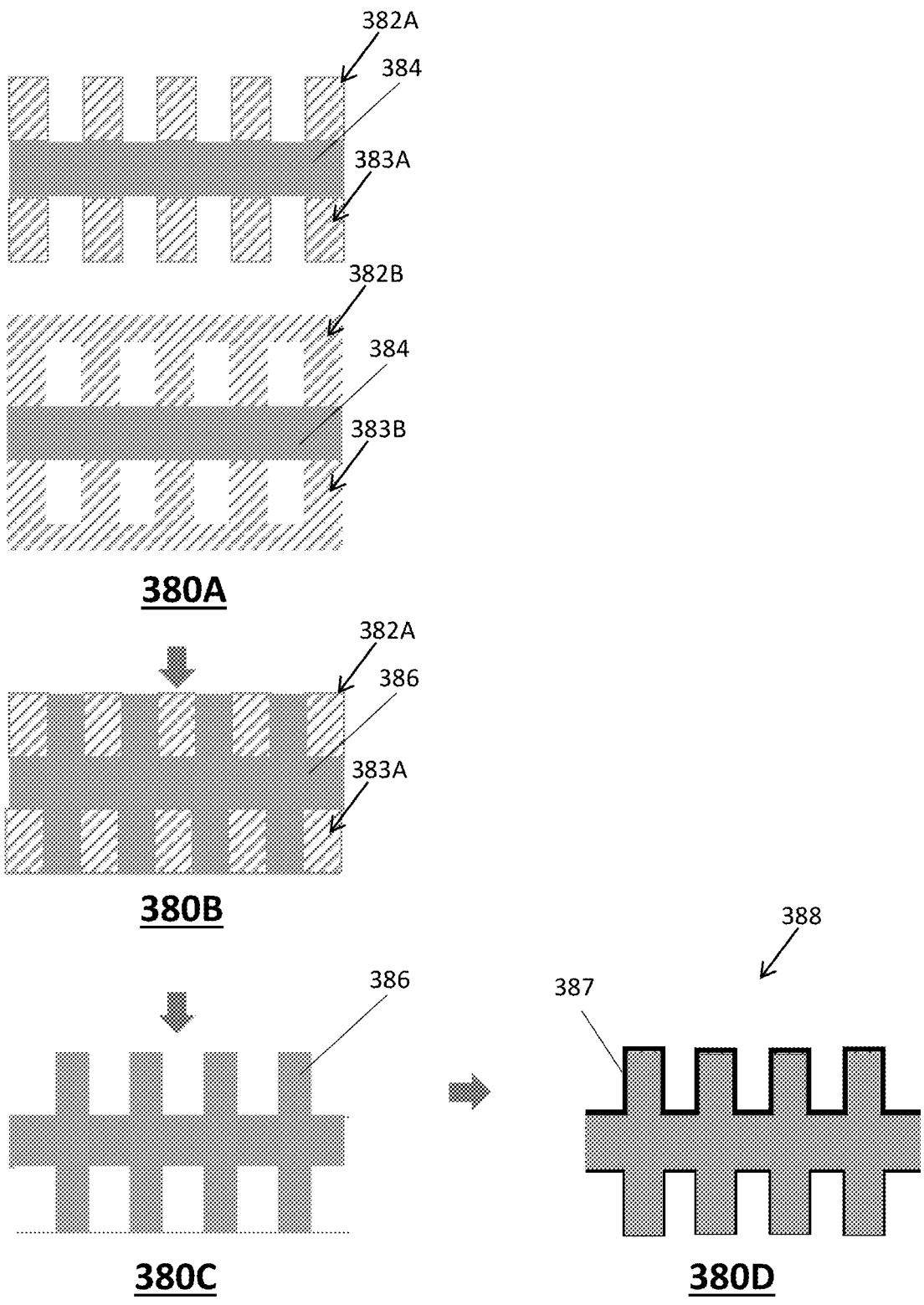

In FIG. 3D, views 380A and 380B show stages similar to stages 370A and 370B, using two templates. In particular, in views 380A and 380B, two templates (either two two-sided templates 382A and 383A, or two one-sided templates 382B and 383B) are pressed against the two faces of a raw solid ionomer layer 384 and generate patterned ionomer layer 386.

In some embodiments, the solid ionomer is hot pressed to the one or two porous templates. The hot pressing may occur at various temperatures and pressures, and for various durations of time. In an example, the hot pressing may occur at about 120° C. and about 2000 psi, for about 20 minutes.

In some embodiments, the raw solid ionomer layer is pressed onto a pristine template to generate the patterned ionomer layer. Examples of pristine templates that may be used include, but are not limited to, anodized aluminum oxide (AAO) templates, anodized titanium oxide templates, porous silicon templates, and track-etched polycarbonate (TEP) templates.

Returning to FIG. 3A, in step 304, the one or two templates are removed from the patterned ionomer layer to generate a membrane-nanowire assembly (such as a one-sided membrane-nanowire assembly 376 of view 370C or a two-sided membrane-nanowire assembly 386 of view 380C). The one or two templates may be removed by detaching or dissolving the template(s).

In some embodiments, the template is detached by being physically peeled from the pressed template/membrane. In some other embodiments, the template is dissolved by immersing the pressed template/membrane in a etchant. For example, the AAO templates may be dissolved by immersing in sodium hydroxide solution or phosphoric acid solution.

In step 306, a catalyst coating (such as coating 377 in view 370D of FIG. 3C, or coating 387 of view 380D of FIG. 3D) is added to the membrane-nanowire assembly to generate a membrane-nanowire electrode assembly (such as a one-sided type 378 in view 370D, or a two-sided type 388 in view 380D).

The catalyst may be deposited directly onto the ionomer nanowire to create the catalyst coating. The deposition may use, for example, chemical vapor deposition. Chemical vapor deposition is a method used to produce solid materials, typically under vacuum. For example, a substrate is exposed to one or more volatile precursors, which react or decompose on the substrate surface to produce the desired deposit.

Figure 4A:
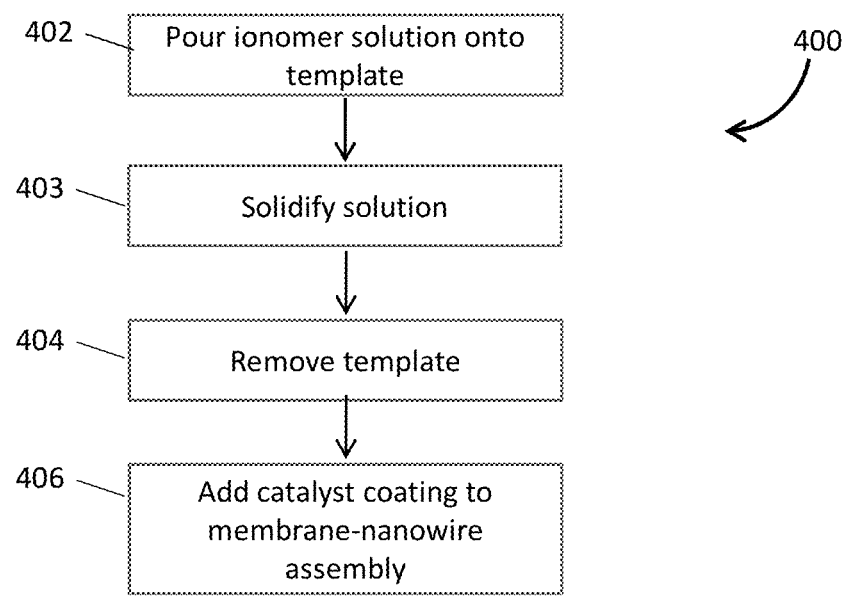
FIGS. 4A-4B illustrate another method of fabricating the nanowire electrodes according to some embodiments.
Figure 4B:
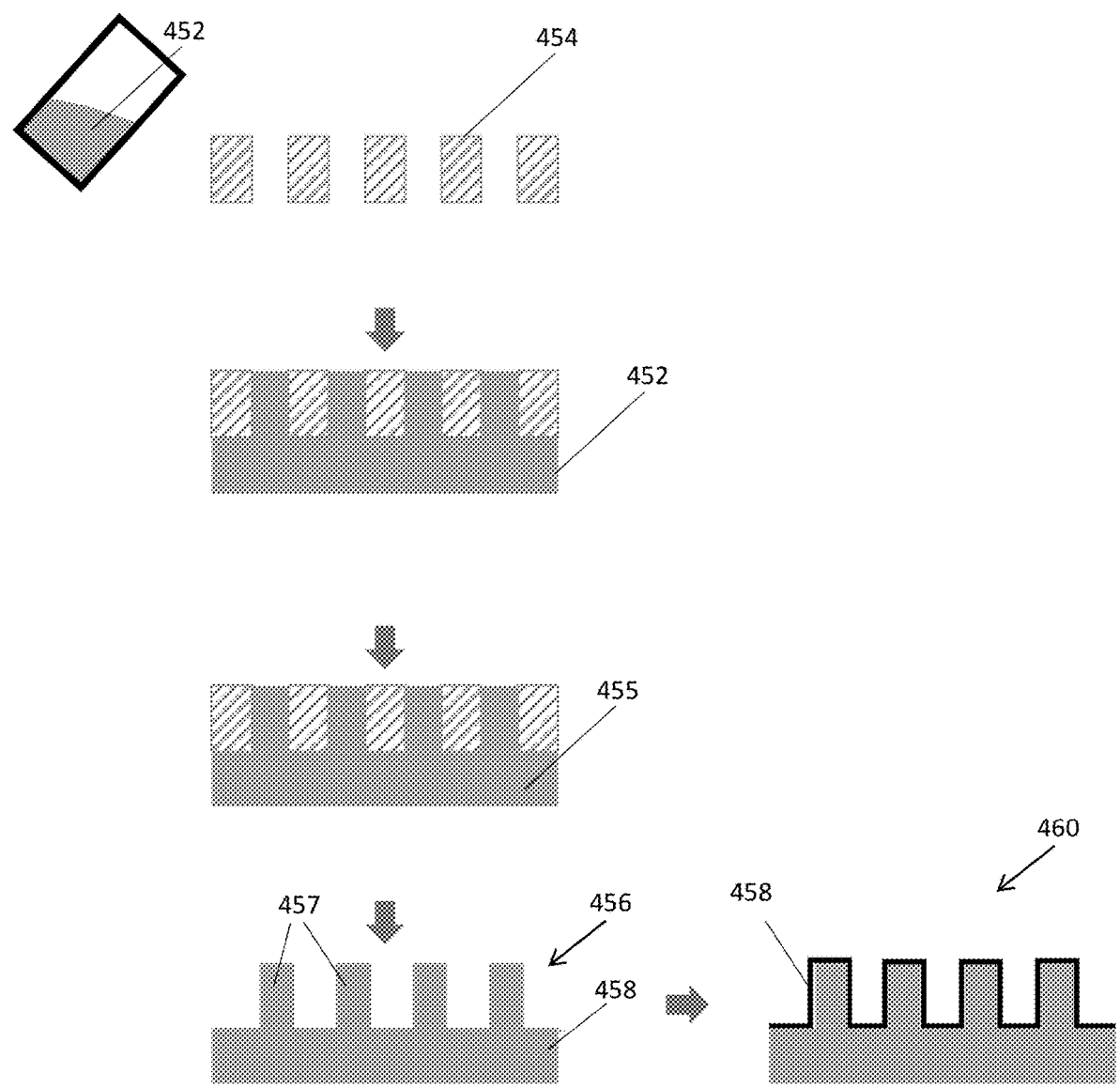

In some embodiments, the ionomer nanowire may be fabricated by impregnating a porous template with a liquid ionomer solution. FIGS. 4A and 4B illustrate such a method of fabricating the nanowire electrodes according to some embodiments. In particular, FIG. 4A is a flow chart 400 for the fabrication and FIG. 4B shows different stages of that fabrication according to some embodiments.

In step 402, a liquid ionomer solution 452 is poured onto a porous template 454. Liquid ionomer solution may be cast onto the porous template and the pores may be filled by capillary wetting. Examples of ionomer solution include, but are not limited to, Nafion, Aquivion, and Liquion. The solvent of the ionomer solution may include, but is not limited to, water, 2-propanol, methanol, ethanol, glycerol, ethylene glycol, 1,2-propanediol, 1,3,-propanediol, and N-Methyl-2-pyrrolidone.

In step 403, ionomer solution 455 is solidified into solid ionomer 455. The cast solution may be dried and annealed. In another example, the cast ionomer solution may be dried in air at room temperature for about 24 hours, followed by annealing in a vacuum oven for about 2 hours at 140° C.

In step 404, template 454 is removed from solidified ionomer 455 to generate a membrane-nanowire assembly 456 having ionomer nanowires 457 protruding from a membrane 458.

In step 406, a catalyst coating 458 is added to membrane-nanowire assembly 456 to generate a membrane-nanowire electrode assembly 460. The addition may utilize various methods, such as those discussed above.

Figure 5A:
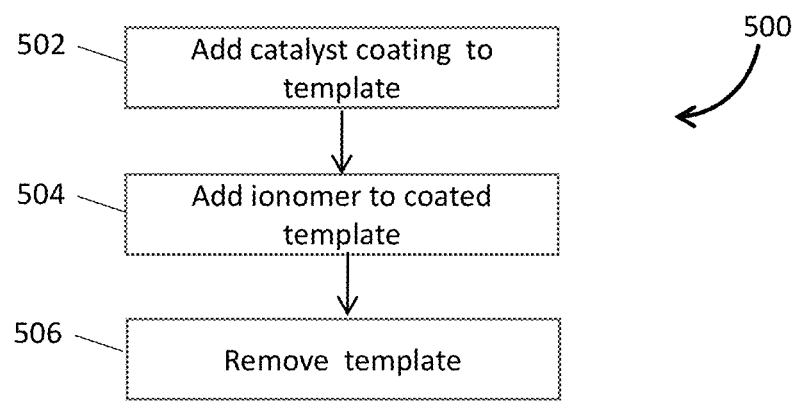
FIGS. 5A-5B illustrate another method of fabricating the nanowire electrodes according to some embodiments.
Figure 5B:
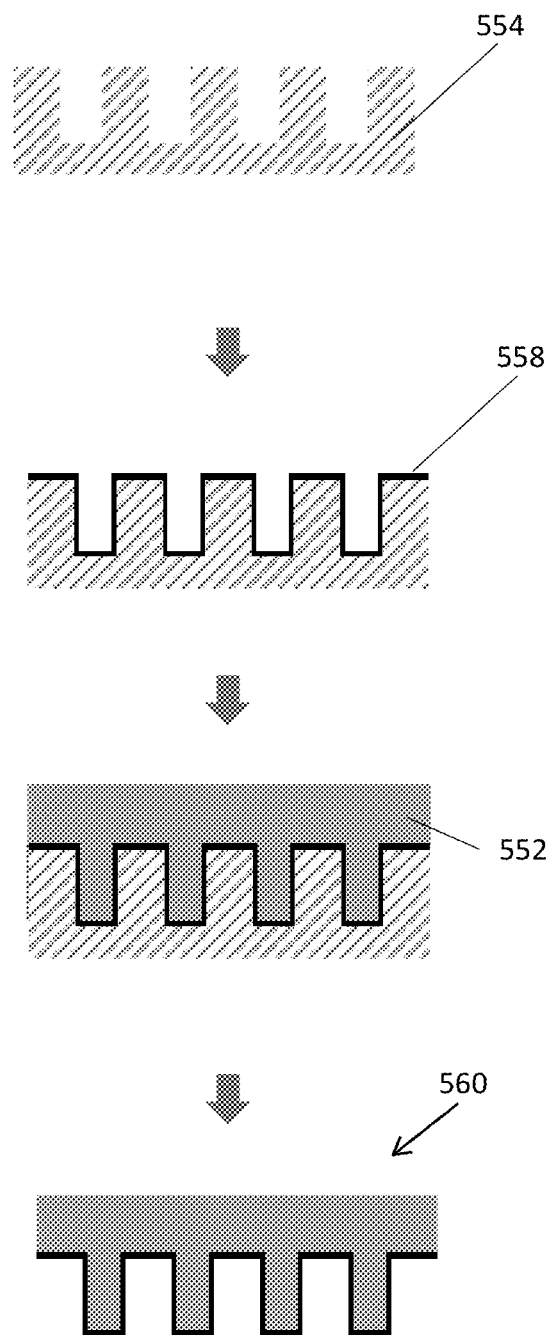

FIGS. 5A and 5B illustrate yet another method of fabricating nanowire electrodes according to some embodiments. In particular, FIG. 5A is a flow chart 500 for the fabrication and FIG. 5B shows different stages of that fabrication according to some embodiments In step 502, catalyst coating 558 is added to template 554. The catalyst may be deposited onto template 554 using atomic layer deposition (ALD). ALD is a thin-film deposition technique based on the sequential use of a gas phase chemical process. In some embodiments, ALD involves two chemicals, known as precursors. The precursors react with a surface of a material one at a time in a sequential, self-limiting manner. A thin film is deposited through the repeated exposure of separate precursors. In an example, about 3 nm of the catalyst may be deposited onto the porous template.

In some embodiments, the porous template is coated with a support material to keep the ionomer nanowires perpendicular to the membrane. The porous template may be coated with the support material prior to depositing the catalyst onto the porous template. Example support materials include, but are not limited to, silicon dioxide ($SiO_2$) and titanium dioxide ($TiO_2$). In an example, about 20 nm of support material may be deposited onto the porous template.

In step 504, ionomer 552 is added to template 554, which is coated, at least in part, with catalyst coating 558. In different embodiments, the ionomer is added via different methods, such as those explained above. For example, the ionomer may be added via pressing a raw solid ionomer layer to the coated template or by pouring an ionomer solution onto the coated template, etc.

In step 506, template 554 is removed from ionomer 352 such that catalyst coating 558 remains attached to the ionomer, thus forming a membrane-nanowire electrode assembly 560. In some embodiments, when the ionomer is added to the template, the catalyst forms an interface with the ionomer, and when the template is removed (e.g., detached or dissolved) the catalyst remains on the ionomer.

In various embodiments, the voids in the nanowire electrode may be empty or may be filled with functional materials as fillers. The functional material may provide one or more of the following advantage: (i) structural support to prevent the collapse of the fibers during fuel cell operation; (ii) electronic conductivity; (iii) proton conductivity; (iv) water management (both removal of water or retaining water), (v) improved gas transport, and (vi) add additional catalyst of different or same type as the catalyst on the nanowire.

Figure 6A:
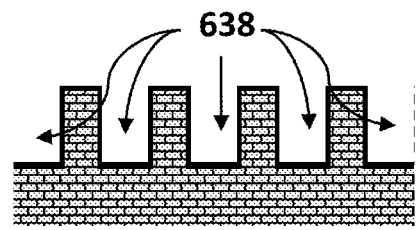
FIGS. 6A and 6B illustrate different void types according to different embodiments.
Figure 6B:
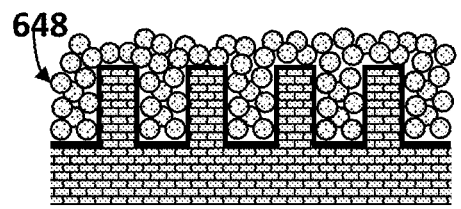

FIGS. 6A and 6B illustrate different void types according to different embodiments. In particular, FIG. 6A is a cross section 630 of a partial view of a membrane-nanowire electrode that includes voids 638. In this embodiment, the voids are empty.

FIG. 6B, on the other hand, shows a cross section 640 of a partial view of a membrane-nanowire electrode in which the voids are filled with a functional material 648 as a filler.

The functional material in the filler may be one or a combination of more than one of the following materials: (i) carbon black (including but not limited to Ketjen black, black pearls 2000, Vulcan XC 72, Acetylene black) or carbon nanotubes (including multiwall or singlewall carbon nanotubes) or carbon fibers to provide structural support and electronic conductivity; (ii) ionomers to provide proton conductivity and also as a binder for particles; (iii) hydrophobic polymers (including but not limited to PTFE, FEP) present both as particles and as a binder to remove water from the pore domain; (iv) oxides (including but not limited to titanium oxide ($TiO_2$), silicon dioxide($SiO_2$)) to provide structural support as well as water management by retaining water in the pore domain; (v) catalyst blacks (including but not limited to platinum, platinum alloys, iridium, cerium); (vi) catalyst mentioned in (v) on support including but not limited to carbon black, $TiO_2$, $SiO_2$, carbon nanotubes; and (vii) surface functionalized carbon black or carbon nanotubes or carbon fibers In some embodiments, the function of the filler material depends on the composition of the filler material. In an example, wettability of the filler material may depend on an amount of $SiO_2$ particles present in the filler material. In another example the filler material used can be $IrO_2$, which is a catalyst for water electrolysis, enabling utilization for reversible fuel cell operation.

Figure 7A:
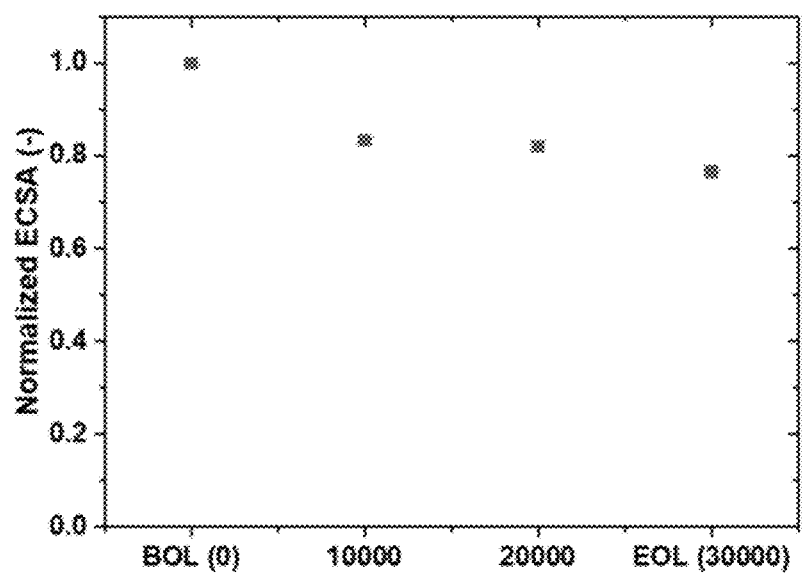
FIGS. 7A and 7B illustrate the durability of the coaxial nanowire electrode according to some embodiments.
Figure 7B:
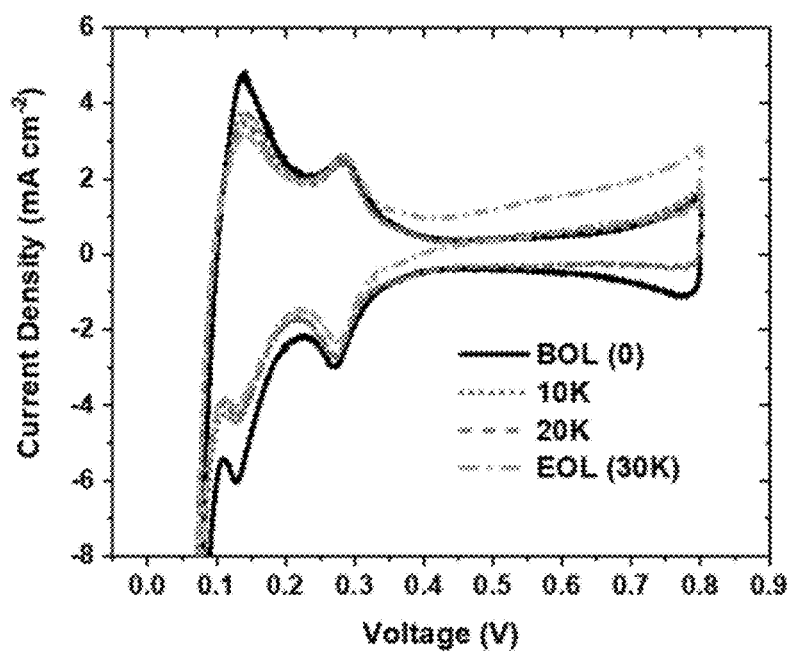

As noted earlier, various embodiments increase the durability of the PEFC compared to the conventional PFFCs. FIGS. 7A and 7B illustrate the durability of the coaxial nanowire electrode according to some embodiments. In particular, FIGS. 7A and 7B show the effects of performing an accelerated stress test (AST) protocol on a cell using coaxial nanowire electrodes according to some embodiments. The AST protocol included holding the cell voltage at 0.6 V for 2.5 seconds and 0.95 V for 2.5 seconds with a rise time and fall time of 0.5 seconds each. The total time of each cycle was therefore 6 seconds. The cycle was repeated for 30,000 times and characterized at every 10,000 cycles. The cell showed a drop of approximately 20% loss in electrochemical surface area (ECSA) over 30,000 cycles. Conventional cells, which use conventional catalysts and electrodes, on the other hand, typically show more than 40% loss during a similar AST, which is at least twice that of the cell using the coaxial nanowire electrode. FIG. 7A shows the ECSA, normalized to the ECSA at BOL, as a function of AST cycles. Majority of the ECSA loss is in the first 10,000 cycles. FIG. 7B is cyclic voltammetry used to determine the ECSA.

CONCLUSION AND GENERAL TERMINOLOGY

The above detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

The foregoing description of the embodiments has been presented for purposes of illustration only. It is not exhaustive and does not limit the embodiments to the precise form disclosed. While several exemplary embodiments and features are described, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. As used herein, the singular forms "a," "an," and "the" may include the plural forms unless the context clearly dictates otherwise. Further, the term "coupled" does not exclude the presence of intermediate elements between the coupled items. Also, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or. Moreover, if these terms are used, a subset of a set may include one or more than one, including all, members of the set. Additionally, terms such as "produce" and "provide," if used, and unless stated or implied otherwise, high level abstractions of the actual operations that are performed. The actual operations may vary depending on the particular implementation.

Further, if used in this disclosure, and unless stated or deducted otherwise, a first variable is an increasing function of a second variable if the first variable does not decrease and instead generally increases when the second variable increases. On the other hand, a first variable is a decreasing function of a second variable if the first variable does not increase and instead generally decreases when the second variable increases. In some embodiment, a first variable may be an increasing or a decreasing function of a second variable if, respectively, the first variable is directly or inversely proportional to the second variable.

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents. Further, the present disclosure is directed toward all novel and non-obvious features and aspects of the various disclosed embodiments, alone and in various combinations and sub-combinations with one another.

While the present disclosure has been particularly described in conjunction with specific embodiments, modifications, and variations will be apparent in light of the foregoing description. It is therefore contemplated that the appended claims will embrace any such alternatives, modifications, and variations as falling within the true spirit and scope of the present disclosure.

What is claimed is:

1. A polymer electrolyte fuel cell (PEFC), comprising:
    a first electrode that includes a first gas diffusion medium and a plurality of coaxial proton conducting nanowires, each nanowire of the plurality of coaxial proton conducting nanowires comprising a polymer with electrically neutral units and ionized units covalently bonded to a polymer backbone, and wherein each nanowire of the plurality of coaxial proton conducting nanowires is coated with a catalyst film;
    a membrane electrolyte; and
    a second electrode.

2. The polymer electrolyte fuel cell (PEFC) of claim 1, further comprising:
    a first electrode-side flow channel; and
    a second electrode-side flow channel.

3. The polymer electrolyte fuel cell (PEFC) of claim 1, wherein the membrane electrolyte is positioned between the first electrode and the second electrode.

4. The polymer electrolyte fuel cell (PEFC) of claim 1, wherein the first electrode and the second electrode are two different members of an electrode set consisting of an anode and a cathode.

5. The polymer electrolyte fuel cell (PEFC) of claim 1, wherein:
    the first electrode is an anode; and
    the second electrode is a cathode.

6. The polymer electrolyte fuel cell (PEFC) of claim 1, wherein
    the membrane electrolyte is positioned between the first electrode and the second electrode; and
    the plurality of nanowires protrude from the membrane electrolyte.

7. The polymer electrolyte fuel cell (PEFC) of claim 6, wherein the membrane electrolyte and the plurality of nanowires comprises ionomer material.

* * * * *